(12) United States Patent
Gogyo (10) Patent No.: US 10,957,936 B2
(45) Date of Patent: Mar. 23, 2021

(54) LITHIUM ION SECONDARY BATTERY (71) Applicant: HITACHI CHEMICAL COMPANY, LTD., Tokyo (JP)

(72) Inventor: Yuma Gogyo, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 143 days.

(21) Appl. No.: 15/771,905

(22) PCT Filed: Nov. 2, 2016

(86) PCT No.: PCT/JP2016/082697
§ 371 (c)(1),
(2) Date: Apr. 27, 2018

(87) PCT Pub. No.: WO2017/078108
PCT Pub. Date: May 11, 2017

(65) Prior Publication Data
US 2018/0316046 A1 Nov. 1, 2018

(30) Foreign Application Priority Data

Nov. 6, 2015 (JP) .............................. JP2015-218153

(51) Int. Cl.
| | |
|---|---|
| *H01M 10/0525* | (2010.01) |
| *H01M 4/485* | (2010.01) |
| *H01M 4/505* | (2010.01) |
| *H01M 4/525* | (2010.01) |
| *H01M 10/0569* | (2010.01) |
| *H01M 4/36* | (2006.01) |
| *H01M 4/02* | (2006.01) |
| *H01M 2/16* | (2006.01) |
| *H01M 2/26* | (2006.01) |
| *H01M 2/30* | (2006.01) |
| *H01M 4/583* | (2010.01) |
| *H01M 4/62* | (2006.01) |
| *H01M 4/66* | (2006.01) |
| *H01M 10/42* | (2006.01) |

(52) U.S. Cl.
CPC ......... *H01M 10/0525* (2013.01); *H01M 2/16* (2013.01); *H01M 2/26* (2013.01); *H01M 2/30* (2013.01); *H01M 4/364* (2013.01); *H01M 4/485* (2013.01); *H01M 4/505* (2013.01); *H01M 4/525* (2013.01); *H01M 4/583* (2013.01); *H01M 4/623* (2013.01); *H01M 4/661* (2013.01); *H01M 10/0569* (2013.01); *H01M 2004/027* (2013.01); *H01M 2004/028* (2013.01); *H01M 2010/4292* (2013.01); *Y02E 60/10* (2013.01); *Y02T 10/70* (2013.01)

(58) Field of Classification Search
CPC ............ H01M 2/16; H01M 2/26; H01M 2/30; H01M 4/364; H01M 4/485; H01M 4/5058; H01M 4/525; H01M 4/583; H01M 4/623; H01M 4/661; H01M 10/0525; H01M 10/0569; H01M 2004/027; H01M 2004/028; H01M 2010/4292; Y02E 60/122; Y02T 10/7011
See application file for complete search history.

(56) References Cited

U.S. PATENT DOCUMENTS

| | | | | |
|---|---|---|---|---|
| 8,728,670 B2* | 5/2014 | Inagaki | ................. | H01M 4/485 429/188 |
| 2005/0147889 A1* | 7/2005 | Ohzuku | ................ | H01M 4/131 429/231.1 |
| 2007/0042274 A1* | 2/2007 | Muraoka | ........... | H01M 10/0525 429/332 |
| 2011/0020674 A1* | 1/2011 | Fujita | .................. | H01M 2/1241 429/53 |
| 2013/0122373 A1 | 5/2013 | Tamura et al. | | |
| 2015/0303513 A1* | 10/2015 | Hirowatari | ........ | H01M 10/0568 429/199 |

(Continued)

FOREIGN PATENT DOCUMENTS

| | | |
|---|---|---|
| CN | 103004005 A | 3/2013 |
| JP | 2006-066341 A | 3/2006 |

(Continued)

OTHER PUBLICATIONS

Machine translation of JP 2012-124026, published on Jun. 28, 2012 (Year: 2012).*

(Continued)

*Primary Examiner* — Anca Eoff
(74) *Attorney, Agent, or Firm* — Fitch, Even, Tabin & Flannery, LLP (57) ABSTRACT

A lithium ion secondary battery includes a positive electrode containing a spinel-type lithium-nickel-manganese composite oxide as a positive electrode active material; a negative electrode containing, as a negative electrode active material, an active material in which introduction and release of lithium ions take place at a potential of 1.2 V or higher relative to a lithium potential; a separator inserted between the positive electrode and the negative electrode; and an electrolytic solution, wherein a capacity ratio of a negative electrode capacity of the negative electrode to a positive electrode capacity of the positive electrode (negative electrode capacity/positive electrode capacity) is 1 or lower, and the electrolytic solution contains dimethyl carbonate as a non-aqueous solvent at a content ratio of higher than 70% by volume with respect to a total amount of the non-aqueous solvent.

20 Claims, 3 Drawing Sheets

(56) References Cited

U.S. PATENT DOCUMENTS

2017/0012317 A1* 1/2017 Fukuta .................. H01M 4/485

FOREIGN PATENT DOCUMENTS

| JP | 2009-043624 A | 2/2009 |
| JP | 2012-033279 A | 2/2012 |
| JP | 2013-243090 A | 12/2013 |
| WO | 2015/111585 A1 | 7/2015 |

OTHER PUBLICATIONS

Uchida, S., Yamagata, M., Ishikawa, M. (2014). Libis(fluorosulfonyl)imide-Based Low EC-Content Electrolyte with Specific Coordination/Solvation Process. In 226th Meeting of the Electrochemical Society,. Retrieved from https://ecs.confex.com/ecs/226/webprogram/Paper39218.html (Year: 2014).*

* cited by examiner

LITHIUM ION SECONDARY BATTERY

CROSS-REFERENCE TO RELATED APPLICATIONS

This application is a U.S. national phase application filed under 35 U.S.C. § 371 of International Application No. PCT/JP2016/082697, filed Nov. 2, 2016, which claims priority from Japanese Patent Application No. 2015-218153, filed Nov. 6, 2015, designating the United States, which are hereby incorporated herein by reference in their entirety.

TECHNICAL FIELD

The present invention relates to a lithium ion secondary battery.

BACKGROUND ART

Lithium ion secondary batteries, a type of non-aqueous electrolyte secondary battery, are high-energy-density secondary batteries and have been used as power sources of portable devices (e.g., laptop computers and cell phones) because of their characteristics.

In recent years, lithium ion secondary batteries have been drawing attention as power sources for increasingly downsized electronic devices, power sources for power storage, power sources for electric cars and the like, and there is a demand for a lithium ion secondary battery having even a higher energy density.

As a means for improving the energy density, for example, a method of using a spinel-type lithium-nickel-manganese composite oxide showing a high operating potential as a positive electrode active material may be employed. However, in a conventional electrolytic solution in which a cyclic carbonate and a linear carbonate are used, such a high potential may cause oxidative degradation of the cyclic carbonate or the linear carbonate in a part where the positive electrode active material and the electrolytic solution are in contact with each other. Further, the product of this oxidative degradation may be accumulated or precipitated on the negative electrode side having a low potential and act as a resistance, as a result of which the capacity of the lithium ion secondary battery may be reduced. Due to these phenomena, in lithium ion secondary batteries using a positive electrode active material showing a high operating potential, there is a problem that satisfactory charge-discharge cycle characteristics cannot be obtained.

As a means for solving this problem, there have been proposed lithium ion secondary batteries in which a negative electrode containing a lithium-titanium composite oxide as a negative electrode active material is used along with an electrolytic solution that contains a non-aqueous solvent having a diethyl carbonate (DEC) content of 80% by volume or higher (see, for example, Patent Document 1).

RELATED ART DOCUMENT

Patent Document

[Patent Document 1] Japanese Patent Application Laid-Open (JP-A) No. 2006-66341

SUMMARY OF INVENTION

Technical Problem

In Patent Document 1, it is mentioned that diethyl carbonate contributes to a reduction in oxidative degradation of a non-aqueous solvent in the vicinity of a positive electrode. Therefore, according to Patent Document 1, it is thought that accumulation or precipitation of a product generated by oxidative degradation of an electrolytic solution on the negative electrode side can be inhibited.

However, even in the lithium ion secondary battery described in Patent Document 1, satisfactory charge-discharge cycle characteristics cannot be obtained in some cases.

The invention was made in view of the above-described circumstances, and an object of the invention is to provide a lithium ion secondary battery which exhibits excellent charge-discharge cycle characteristics even with the use of a positive electrode active material showing a high operating potential.

Solution to Problem

Concrete means for achieving the above-described object encompasses the followings.

<1> A lithium ion secondary battery, comprising:
a positive electrode comprising a spinel-type lithium-nickel-manganese composite oxide as a positive electrode active material;
a negative electrode comprising, as a negative electrode active material, an active material in which introduction and release of lithium ions take place at a potential of 1.2 V or higher relative to a lithium potential;
a separator inserted between the positive electrode and the negative electrode; and
an electrolytic solution, wherein:
a capacity ratio of a negative electrode capacity of the negative electrode to a positive electrode capacity of the positive electrode (negative electrode capacity/positive electrode capacity) is 1 or lower, and
the electrolytic solution comprises dimethyl carbonate as a non-aqueous solvent at a content ratio of higher than 70% by volume with respect to a total amount of the non-aqueous solvent.

<2> The lithium ion secondary battery according to <1>, wherein the spinel-type lithium-nickel-manganese composite oxide comprises a compound represented by $LiNi_xMn_{2-x}O_4$, wherein $0.3<X<0.7$.

<3> The lithium ion secondary battery according to <1> or <2>, wherein the spinel-type lithium-nickel-manganese composite oxide has a BET specific surface area of less than 2.9 $m^2/g$.

<4> The lithium ion secondary battery according to any one of <1> to <3>, wherein the spinel-type lithium-nickel-manganese composite oxide has a BET specific surface area of 0.05 $m^2/g$ or larger.

<5> The lithium ion secondary battery according to any one of <1> to <4>, wherein particles of the spinel-type lithium-nickel-manganese composite oxide have a median diameter D50 of from 0.5 μm to 100 μm.

<6> The lithium ion secondary battery according to any one of <1> to <5>, wherein the active material, in which introduction and release of lithium ions take place at a potential of 1.2 V or higher relative to the lithium potential, has a BET specific surface area of less than 40 $m^2/g$.

<7> The lithium ion secondary battery according to any one of <1> to <6>, wherein the active material, in which introduction and release of lithium ions take place at a potential of 1.2 V or higher relative to the lithium potential, has a BET specific surface area of 0.1 $m^2/g$ or larger.

<8> The lithium ion secondary battery according to any one of <1> to <7>, wherein particles of the active material, in which introduction and release of lithium ions take place at a potential of 1.2 V or higher relative to the lithium potential, have a median diameter D50 of from 0.5 μm to 100 μm.

<9> The lithium ion secondary battery according to any one of <1> to <8>, wherein the content ratio of dimethyl carbonate is 75% by volume or higher with respect to the total amount of the non-aqueous solvent.

<10> The lithium ion secondary battery according to any one of <1> to <9>, wherein the capacity ratio of the negative electrode capacity of the negative electrode to the positive electrode capacity of the positive electrode (negative electrode capacity/positive electrode capacity) is from 0.6 to less than 1.

<11> A lithium ion secondary battery, comprising:
a positive electrode comprising a spinel-type lithium-nickel-manganese composite oxide as a positive electrode active material;
a negative electrode comprising a lithium-titanium composite oxide as a negative electrode active material;
a separator inserted between the positive electrode and the negative electrode; and
an electrolytic solution, wherein:
a capacity ratio of a negative electrode capacity of the negative electrode to a positive electrode capacity of the positive electrode (negative electrode capacity/positive electrode capacity) is 1 or lower, and
the electrolytic solution comprises dimethyl carbonate as a non-aqueous solvent at a content ratio of higher than 70% by volume with respect to a total amount of the non-aqueous solvent.

<12> The lithium ion secondary battery according to <11>, wherein the spinel-type lithium-nickel-manganese composite oxide comprises a compound represented by $LiNi_xMn_{2-x}O_4$, wherein $0.3<X<0.7$.

<13> The lithium ion secondary battery according to <11> or <12>, wherein the spinel-type lithium-nickel-manganese composite oxide has a BET specific surface area of less than 2.9 $m^2/g$.

<14> The lithium ion secondary battery according to any one of <11> to <13>, wherein the spinel-type lithium-nickel-manganese composite oxide has a BET specific surface area of 0.05 $m^2/g$ or larger.

<15> The lithium ion secondary battery according to any one of <11> to <14>, wherein particles of the spinel-type lithium-nickel-manganese composite oxide have a median diameter D50 of from 0.5 μm to 100 μm.

<16> The lithium ion secondary battery according to any one of <11> to <15>, wherein the lithium-titanium composite oxide has a BET specific surface area of less than 40 $m^2/g$.

<17> The lithium ion secondary battery according to any one of <11> to <16>, wherein the lithium-titanium composite oxide has a BET specific surface area of 0.1 $m^2/g$ or larger.

<18> The lithium ion secondary battery according to any one of <11> to <17>, wherein particles of the lithium-titanium composite oxide have a median diameter D50 of from 0.5 μm to 100 μm.

<19> The lithium ion secondary battery according to any one of <11> to <18>, wherein the content ratio of dimethyl carbonate is 75% by volume or higher with respect to the total amount of the non-aqueous solvent.

<20> The lithium ion secondary battery according to any one of <11> to <19>, wherein the capacity ratio of the negative electrode capacity of the negative electrode to the positive electrode capacity of the positive electrode (negative electrode capacity/positive electrode capacity) is from 0.6 to less than 1.

Effects of Invention

According to the invention, a lithium ion secondary battery which exhibits excellent charge-discharge cycle characteristics even with the use of a positive electrode active material showing a high operating potential can be provided.

DESCRIPTION OF EMBODIMENTS

Embodiments of the lithium ion secondary battery of the invention are described below. However, the invention is not restricted to the following embodiments. In the following embodiments, the constituents thereof (including elemental steps and the like) are not indispensable unless otherwise specified. The same applies to the numerical values and their ranges, and the invention is not restricted by such constituents by any means.

In the present specification, those numerical ranges that are stated with "to" each denote a range that includes the numerical values stated before and after "to" as the lower and upper limit values, respectively.

In a set of numerical ranges that are stated in a stepwise manner in the present specification, the upper limit value or the lower limit value of a certain numerical range may be replaced with the upper limit value or the lower limit value of other numerical range. Further, in a numerical range stated in the present specification, the upper limit value or the lower limit value of the numerical range may be replaced with a value indicated in Examples.

In the present specification, when reference is made to the content ratio of a component and in cases where there are plural substances corresponding to the component, the indicated content ratio means the total content ratio of the plural substances unless otherwise specified. Further, in the present specification, when reference is made to the particle size of a component and in cases where there are plural kinds of particles corresponding to the component, the indicated particle size means a value for a mixture of the plural kinds of particles.

In the present specification, the term "film" encompasses, when observed in a plane view, not only those films having a constitution of a shape formed over the entirety of a surface but also those films having a constitution of a shape formed on a part of a surface.

In the present specification, the term "layer" encompasses, when observed in a plane view, not only those layers having a constitution of a shape formed over the entirety of a surface but also those layers having a constitution of a shape formed on a part of a surface. The term "laminate" indicates that layers are disposed on top of each other, and two or more layers may be bonded with each other or may be detachable from one another.

In the present specification, the term "solid content" of a positive electrode mixture or a negative electrode mixture means a component(s) that remain after removing a volatile component(s) such as an organic solvent(s) from the positive electrode mixture or the negative electrode mixture.

First Embodiment

A lithium ion secondary battery of a first embodiment includes a positive electrode containing a spinel-type lithium-nickel-manganese composite oxide as a positive electrode active material; a negative electrode containing, as a negative electrode active material, an active material in which introduction and release of lithium ions take place at a potential of 1.2 V or higher relative to a lithium potential (hereinafter, may be referred to as "specific negative electrode active material"); a separator inserted between the positive electrode and the negative electrode; and an electrolytic solution, wherein a capacity ratio of a negative electrode capacity of the negative electrode to a positive electrode capacity of the positive electrode (negative electrode capacity/positive electrode capacity) is 1 or lower, and the electrolytic solution contains dimethyl carbonate (hereinafter, may be referred to as "DMC") as a non-aqueous solvent at a content ratio of higher than 70% by volume with respect to a total amount of the non-aqueous solvent.

In the lithium ion secondary battery of this embodiment, the negative electrode contains a negative electrode active material in which introduction and release of lithium ions take place at a potential of 1.2 V or higher relative to the lithium potential; therefore, the lithium ion secondary battery of this embodiment substantially operates as a "battery" at a negative electrode potential of 1.2 V or higher. For example, even if a conventional lithium ion secondary battery using graphite as its negative electrode were brought into an over-discharged state and the negative electrode potential consequently increased to 1.2 V or higher, such a battery could not be realistically considered as a lithium ion secondary battery whose negative electrode operates at a potential of 1.2 V or higher and is, therefore, excluded from the scope of the invention. In the invention, in order to say that a negative electrode contains a negative electrode active material in which introduction and release of lithium ions take place at a potential of 1.2 V or higher relative to the lithium potential, it is required that, when discharging is performed in conditions in which a lithium ion secondary battery is normally used, at least 50% of the quantity of discharged electricity is discharged in a negative electrode operating region in which the negative electrode potential is 1.2 V or higher. In other words, it is required that the operating potential of the negative electrode is substantially 1.2 V (vs. Li/Li$^+$) or higher.

According to the lithium ion secondary battery of the first embodiment, excellent charge-discharge cycle characteristics can be attained even with the use of a positive electrode active material showing a high operating potential. The reason for this is not clear; however, it is speculated as follows.

Dimethyl carbonate has excellent oxidation resistance and is thus unlikely to be degraded even when a high-potential positive electrode containing a spinel-type lithium-nickel-manganese composite oxide as a positive electrode active material is used. Meanwhile, in the lithium ion secondary battery of the first embodiment, since the capacity ratio of a negative electrode capacity of the negative electrode to a positive electrode capacity of the positive electrode (negative electrode capacity/positive electrode capacity) is 1 or lower, the negative electrode potential may decrease to 1.4 V or less during charging. However, dimethyl carbonate also has excellent reduction resistance, so that it is unlikely to be reduced and degraded even on a negative electrode in which a lithium-titanium composite oxide (LTO) or the like is used as a negative electrode active material. Therefore, it is surmised that, when the content ratio of dimethyl carbonate is higher than 70% by volume with respect to the total amount of non-aqueous solvent(s), the charge-discharge cycle characteristics are improved even if the capacity ratio (negative electrode capacity/positive electrode capacity) is 1 or lower.

(Positive Electrode Active Material)

In the lithium ion secondary battery of the first embodiment, a positive electrode active material containing a spinel-type lithium-nickel-manganese composite oxide is used. The content ratio of the spinel-type lithium-nickel-manganese composite oxide with respect to the positive electrode active material is preferably from 50% by mass to 100% by mass. As long as the content ratio of the spinel-type lithium-nickel-manganese composite oxide with respect to the positive electrode active material is 50% by mass or higher, the energy density of the lithium ion secondary battery tends to be further improved.

From the standpoint of further improving the energy density of the lithium ion secondary battery, the content ratio of the spinel-type lithium-nickel-manganese composite oxide with respect to the positive electrode active material is more preferably from 60% by mass to 100% by mass, still more preferably from 70% by mass to 100% by mass, particularly preferably from 85% by mass to 100% by mass.

The spinel-type lithium-nickel-manganese composite oxide contained in the positive electrode active material of the lithium ion secondary battery of the first embodiment is preferably a compound represented by $LiNi_xMn_{2-x}O_4$ (0.3<X<0.7), more preferably a compound represented by $LiNi_xMn_{2-x}O_4$ (0.4<X<0.6) and, from the stability standpoint, it is still more preferably $LiNi_{0.5}Mn_{1.5}O_4$.

In order to further stabilize the crystal structure of the spinel-type lithium-nickel-manganese composite oxide, some of the Mn, Ni or O sites of the spinel-type lithium-nickel-manganese composite oxide may be substituted with other element.

Further, excess lithium may be allowed to exist in a crystal of the spinel-type lithium-nickel-manganese composite oxide. Moreover, a spinel-type lithium-nickel-manganese composite oxide in which an O site is made defective may be used as well.

Examples of an element with which the Mn or Ni sites of the spinel-type lithium-nickel-manganese composite oxide can be substituted include Ti, V, Cr, Fe, Co, Zn, Cu, W, Mg, Al, and Ru. The Mn or Ni sites of the spinel-type lithium-nickel-manganese composite oxide may be substituted with one of, or two or more of these metal elements. Among these elements that can be used for the substitution, it is preferred to use Ti from the standpoint of further stabilizing the crystal structure of the spinel-type lithium-nickel-manganese composite oxide.

Examples of an element with which the O sites of the spinel-type lithium-nickel-manganese composite oxide can be substituted include F and B. The O sites of the spinel-type lithium-nickel-manganese composite oxide may be substituted with one of, or two or more of such elements. Among these elements that can be used for the substitution, it is preferred to use F from the standpoint of further stabilizing the crystal structure of the spinel-type lithium-nickel-manganese composite oxide.

From the standpoint of attaining a high energy density, the spinel-type lithium-nickel-manganese composite oxide in a charged state has a potential of preferably from 4.5 V to 5.1 V, more preferably from 4.6 V to 5.0 V, with respect to Li/Li$^+$.

From the standpoint of improving the storage characteristics, the BET specific surface area of the spinel-type lithium-nickel-manganese composite oxide is preferably smaller than 2.9 m$^2$/g, more preferably smaller than 2.8 m$^2$/g, still more preferably smaller than 1.5 m$^2$/g, particularly preferably smaller than 1.0 m$^2$/g. The BET specific surface area of the spinel-type lithium-nickel-manganese composite oxide may be smaller than 0.3 m$^2$/g as well. From the standpoint of improving the input-output characteristics, the BET specific surface area is preferably 0.05 m$^2$/g or larger, more preferably 0.08 m$^2$/g or larger, still more preferably 0.1 m$^2$/g or larger.

The BET specific surface area of the spinel-type lithium-nickel-manganese composite oxide is thus preferably from 0.05 m$^2$/g to smaller than 2.9 m$^2$/g, more preferably from 0.05 m$^2$/g to smaller than 2.8 m$^2$/g, still more preferably from 0.08 m$^2$/g to smaller than 1.5 m$^2$/g, particularly preferably from 0.1 m$^2$/g to smaller than 1.0 m$^2$/g. The BET specific surface area of the spinel-type lithium-nickel-manganese composite oxide may be from 0.1 m$^2$/g to smaller than 0.3 m$^2$/g as well.

The BET specific surface area can be measured, for example, based on the nitrogen adsorption capacity in accordance with JIS Z8830:2013. As an evaluation apparatus, for example, AUTOSORB-1 (trade name) manufactured by Quantachrome Instruments can be employed. In the measurement of the BET specific surface area, since moisture adsorbed on the sample surface or in the sample structure is believed to influence the gas adsorption capacity, it is preferred to first perform a pretreatment for moisture removal by heating.

In this pretreatment, a measurement cell loaded with 0.05 g of a measurement sample is subjected decompression to 10 Pa or less using a vacuum pump and subsequently heated and retained at 110° C. for at least three hours, after which the measurement cell is naturally cooled to normal temperature (25° C.) with the decompressed state being maintained. After the pretreatment, the measurement is performed at an evaluation temperature of 77K in an evaluation pressure range of less than 1 in terms of relative pressure (equilibrium pressure with respect to the saturated vapor pressure).

The median diameter D50 of particles of the spinel-type lithium-nickel-manganese composite oxide (the median diameter D50 of secondary particles in a case where primary particles aggregate with each other to form secondary particles) is, from the standpoint of the dispersibility of the particles, preferably from 0.5 μm to 100 more preferably from 1 μm to 50 μm.

The median diameter D50 can be determined from a particle size distribution obtained by a laser diffraction-scattering method. Specifically, the lithium-nickel-manganese composite oxide is added to pure water in an amount of 1% by mass and then dispersed for 15 minutes by ultrasonication, followed by measurement in accordance with a laser diffraction-scattering method.

In the lithium ion secondary battery of the first embodiment, the positive electrode active material may contain a positive electrode active material other than the spinel-type lithium-nickel-manganese composite oxide.

Examples of the positive electrode active material other than the lithium-nickel-manganese composite oxide include Li$_x$CoO$_2$, Li$_x$NiO$_2$, Li$_x$MnO$_2$, Li$_x$Co$_y$Ni$_{1-y}$O$_2$, Li$_x$Co$_y$M$^1_{1-y}$O$_z$ (in Li$_x$Co$_y$M$^1_{1-y}$O$_z$, M$^1$ represents at least one element selected from the group consisting of Na, Mg, Sc, Y, Mn, Fe, Cu, Zn, Al, Cr, Pb, Sb, V, and B), Li$_x$Ni$_{1-y}$M$^2_y$O$_z$ (in Li$_x$Ni$_{1-y}$M$^2_y$O$_z$, M$^2$ represents at least one element selected from the group consisting of Na, Mg, Sc, Y, Mn, Fe, Co, Cu, Zn, Al, Cr, Pb, Sb, V, and B), Li$_x$Mn$_2$O$_4$, and Li$_x$Mn$_{2-y}$M$^3_y$O$_4$ (in Li$_x$Mn$_{2-y}$M$^3_y$O$_4$, M$^3$ represents at least one element selected from the group consisting of Na, Mg, Sc, Y, Fe, Co, Cu, Zn, Al, Cr, Pb, Sb, V, and B). It is noted here that x is in a range of 0<x≤1.2, y is in a range of from 0 to 0.9, and z is in a range of from 2.0 to 2.3. The value of x representing the molar ratio of lithium varies due to charging and discharging.

When a positive electrode active material other than the spinel-type lithium-nickel-manganese composite oxide is incorporated as a positive electrode active material, the BET specific surface area of such other positive electrode active material is, from the standpoint of improving the storage characteristics, preferably smaller than 2.9 m$^2$/g, more preferably less than 2.8 m$^2$/g, still more preferably smaller than 1.5 m$^2$/g, particularly preferably smaller than 1.0 m$^2$/g. The BET specific surface area of the other positive electrode active material may be smaller than 0.3 m$^2$/g as well. From the standpoint of improving the input-output characteristics, the BET specific surface area is preferably 0.05 m$^2$/g or larger, more preferably 0.08 m$^2$/g or larger, still more preferably 0.1 m$^2$/g or larger.

The BET specific surface area of the other positive electrode active material is thus preferably from 0.05 m$^2$/g to smaller than 2.9 m$^2$/g, more preferably from 0.05 m$^2$/g to smaller than 2.8 m$^2$/g, still more preferably from 0.08 m$^2$/g to smaller than 1.5 m$^2$/g, particularly preferably from 0.1 m$^2$/g to smaller than 1.0 m$^2$/g. The BET specific surface area of the other positive electrode active material may be from 0.1 m$^2$/g to smaller than 0.3 m$^2$/g as well.

The BET specific surface area of the other positive electrode active material can be measured in the same manner as in the case of the spinel-type lithium-nickel-manganese composite oxide.

When a positive electrode active material other than the spinel-type lithium-nickel-manganese composite oxide is incorporated as a positive electrode active material, the median diameter D50 of particles of such other positive electrode active material (the median diameter D50 of secondary particles in a case where primary particles aggregate with each other to form secondary particles) is, from the standpoint of the dispersibility of the particles, preferably from 0.5 μm to 100 μm, more preferably from 1 μm to 50 μm. The median diameter D50 of such other positive electrode active material can be measured in the same manner as in the case of the spinel-type lithium-nickel-manganese composite oxide.

(Negative Electrode Active Material)

In the lithium ion secondary battery of the first embodiment, a negative electrode active material containing a specific negative electrode active material is used. The content ratio of the specific negative electrode active material with respect to the negative electrode active material is preferably from 50% by mass to 100% by mass. As long as the content ratio of the specific negative electrode active material with respect to the negative electrode active material is 50% by mass or higher, the energy density of the lithium ion secondary battery tends to be further improved.

The content ratio of the specific negative electrode active material with respect to the negative electrode active material is more preferably from 70% by mass to 100% by mass, still more preferably from 80% by mass to 100% by mass.

In the first embodiment, the "specific negative electrode active material" refers to "an active material in which an introduction reaction and a release reaction of lithium ions hardly take place at a potential of lower than 1.2 V relative to the lithium potential but exclusively take place at a potential of 1.2 V or higher relative to the lithium potential".

Specifically, the "specific negative electrode active material" means "an active material in which the introduction reaction and the release reaction of lithium ions take place at a potential of 1.2 V or higher relative to the lithium potential in conjunction with an electrochemical capacity of at least 100 mAh/g per unit mass of the active material". Examples of such an active material include lithium-titanium composite oxides, molybdenum oxides, iron sulfide, and titanium sulfide. Thereamong, lithium-titanium composite oxides (LTO) are preferred. Examples of the lithium-titanium composite oxides include lithium titanate.

A lithium-titanium composite oxide used as the negative electrode active material of the lithium ion secondary battery of the first embodiment is preferably a spinel-type lithium-titanium composite oxide. The basic formulation of the spinel-type lithium-titanium composite oxide is represented by $Li[Li_{1/3}Ti_{5/3}]O_4$.

In order to further stabilize the crystal structure of the spinel-type lithium-titanium composite oxide, some of the Li, Ti or O sites of the spinel-type lithium-titanium composite oxide may be substituted with other element.

Further, excess lithium may be allowed to exist in a crystal of the spinel-type lithium-titanium composite oxide. Moreover, a spinel-type lithium-titanium composite oxide in which an O site is made defective may be used as well.

Examples of an element with which the Li or Ti sites of the spinel-type lithium-titanium composite oxide can be substituted include Nb, V, Mn, Ni, Cu, Co, Zn, Sn, Pb, Al, Mo, Ba, Sr, Ta, Mg, and Ca. The Li or Ti sites of the spinel-type lithium-titanium composite oxide may be substituted with one of, or two or more of these elements. Among these elements that can be used for the substitution, it is preferred to use Al from the standpoint of further stabilizing the crystal structure of the spinel-type lithium-titanium composite oxide.

Examples of an element with which the O sites of the spinel-type lithium-titanium composite oxide can be substituted include F and B. The O sites of the spinel-type lithium-titanium composite oxide may be substituted with one of, or two or more of such elements. Among these elements that can be used for the substitution, it is preferred to use F from the standpoint of further stabilizing the crystal structure of the spinel-type lithium-titanium composite oxide.

From the standpoint of improving the storage characteristics, the BET specific surface area of the negative electrode active material is preferably smaller than 40 $m^2/g$, more preferably smaller than 30 $m^2/g$, still more preferably smaller than 20 $m^2/g$, particularly preferably smaller than 15 $m^2/g$. From the standpoint of improving the input-output characteristics, the BET specific surface area is preferably 0.1 $m^2/g$ or larger, more preferably 0.5 $m^2/g$ or larger, still more preferably 1.0 $m^2/g$ or larger, particularly preferably 2.0 $m^2/g$ or larger. The BET specific surface area of the negative electrode active material may be smaller than 2.9 $m^2/g$, smaller than 2.8 $m^2/g$, smaller than 1.5 $m^2/g$, or smaller than 0.3 $m^2/g$. Meanwhile, the BET specific surface area of the negative electrode active material may be 0.05 $m^2/g$ or larger, 0.08 $m^2/g$ or larger, or 0.1 $m^2/g$ or larger.

The BET specific surface area of the negative electrode active material is thus preferably from 0.1 $m^2/g$ to smaller than 40 $m^2/g$, more preferably from 0.5 $m^2/g$ to smaller than 30 $m^2/g$, still more preferably from 1.0 $m^2/g$ to smaller than 20 $m^2/g$, particularly preferably from 2.0 $m^2/g$ to smaller than 15 $m^2/g$. The BET specific surface area of the negative electrode active material may be from 0.05 $m^2/g$ to smaller than 2.9 $m^2/g$, from 0.05 $m^2/g$ to smaller than 2.8 $m^2/g$, from 0.08 $m^2/g$ to smaller than 1.5 $m^2/g$, or from 0.1 $m^2/g$ to smaller than 0.3 $m^2/g$.

The BET specific surface area of the negative electrode active material can be measured in the same manner as in the case of the spinel-type lithium-nickel-manganese composite oxide.

The median diameter D50 of particles of the negative electrode active material (the median diameter D50 of secondary particles in a case where primary particles aggregate with each other to form secondary particles) is, from the standpoint of the dispersibility of the particles, preferably from 0.5 μm to 100 μm more preferably from 1 μm to 50 μm.

The median diameter D50 of the negative electrode active material can be measured in the same manner as in the case of the spinel-type lithium-nickel-manganese composite oxide.

<Overall Configuration of Lithium Ion Secondary Battery>

(Positive Electrode)

The lithium ion secondary battery of the first embodiment includes the below-described positive electrode that is applicable to lithium ion secondary batteries. The positive electrode (positive electrode plate) according to the first embodiment has a current collector, and a positive electrode mixture formed on one or both sides of the current collector. The positive electrode mixture contains the above-described positive electrode active material.

The positive electrode of the lithium ion secondary battery can be formed by mixing the above-described positive electrode active material containing a spinel-type lithium-nickel-manganese composite oxide with a conductive agent; adding an appropriate binder and an appropriate solvent to the resulting mixture as required; coating the thus obtained paste-form positive electrode mixture on the surface of a current collector made of a metal foil (e.g., aluminum foil), followed by drying; and then, as required, increasing the density of the positive electrode mixture by pressing or the like.

The positive electrode mixture may be configured using the above-described components; however, for the purpose of, for example, improving the properties of the lithium ion secondary battery, a known olivine-type lithium salt, chalcogen compound, manganese dioxide and the like may also be incorporated into the positive electrode mixture.

From the standpoints of energy density and input-output characteristics, the amount of the positive electrode mixture to be coated on one side of the current collector is preferably from 100 $g/m^2$ to 250 $g/m^2$, more preferably from 110 $g/m^2$ to 200 $g/m^2$, still more preferably from 130 $g/m^2$ to 170 $g/m^2$, in terms of the solid content of the positive electrode mixture.

From the standpoints of energy density and input-output characteristics, the density of the positive electrode mixture is preferably from 1.8 $g/cm^3$ to 3.3 $g/cm^3$, more preferably from 2.0 $g/cm^3$ to 3.2 $g/cm^3$, still more preferably from 2.2 $g/cm^3$ to 2.8 $g/cm^3$, in terms of the solid content of the positive electrode mixture.

(Negative Electrode)

The lithium ion secondary battery of the first embodiment includes the below-described negative electrode that is applicable to lithium ion secondary batteries. The negative electrode (negative electrode plate) according to the first embodiment has a current collector, and a negative electrode mixture formed on one or both sides of the current collector. The negative electrode mixture contains the above-described negative electrode active material.

The negative electrode can be formed by mixing the above-described negative electrode active material containing a specific negative electrode active material (e.g., lithium-titanium composite oxide) with a conductive agent; adding an appropriate binder and an appropriate solvent to the resulting mixture as required; coating the thus obtained paste-form negative electrode mixture on the surface of a current collector made of a metal foil (e.g., copper), followed by drying; and then, as required, increasing the density of the negative electrode mixture by pressing or the like.

The negative electrode mixture may be configured using the above-described components; however, for the purpose of, for example, improving the properties of the lithium ion secondary battery, a known carbon material and the like may also be incorporated into the negative electrode mixture.

From the standpoints of energy density and input-output characteristics, the amount of the negative electrode mixture to be coated on one side of the current collector is preferably from $10 \text{ g/m}^2$ to $225 \text{ g/m}^2$, more preferably from $50 \text{ g/m}^2$ to $200 \text{ g/m}^2$, still more preferably from $80 \text{ g/m}^2$ to $160 \text{ g/m}^2$, in terms of the solid content of the negative electrode mixture.

From the standpoints of energy density and input-output characteristics, the density of the positive electrode mixture is preferably from $1.0 \text{ g/cm}^3$ to $3.3 \text{ g/cm}^3$, more preferably from $1.2 \text{ g/cm}^3$ to $3.2 \text{ g/cm}^3$, still more preferably from $1.4 \text{ g/cm}^3$ to $2.8 \text{ g/cm}^3$, in terms of the solid content of the negative electrode mixture.

From the standpoint of further improving the input-output characteristics, the conductive agent used in the positive electrode (hereinafter, referred to as "positive electrode conductive agent") is preferably acetylene black. From the standpoint of the input-output characteristics, the content ratio of the positive electrode conductive agent is preferably 4% by mass or higher, more preferably 5% by mass or higher, still more preferably 5.5% by mass or higher, based on the total solid content of the positive electrode mixture. The upper limit thereof is, from the standpoint of the battery capacity, preferably 10% by mass or less, more preferably 9% by mass or less, still more preferably 8.5% by mass or less.

The content ratio of the positive electrode conductive agent is thus preferably from 4% by mass to 10% by mass, more preferably from 5% by mass to 9% by mass, still more preferably from 5.5% by mass to 8.5% by mass, based on the total solid content of the positive electrode mixture.

From the standpoint of further improving the input-output characteristics, the conductive agent used in the negative electrode (hereinafter, referred to as "negative electrode conductive agent") is also preferably acetylene black. From the standpoint of the input-output characteristics, the content ratio of the negative electrode conductive agent is preferably 1% by mass or higher, more preferably 4% by mass or higher, still more preferably 6% by mass or higher, based on the total solid content of the negative electrode mixture. The upper limit thereof is, from the standpoint of the battery capacity, preferably 15% by mass or less, more preferably 12% by mass or less, still more preferably 10% by mass or less.

The content ratio of the negative electrode conductive agent is thus preferably from 1% by mass to 15% by mass, more preferably from 4% by mass to 12% by mass, still more preferably from 6% by mass to 10% by mass, based on the total solid content of the negative electrode mixture.

(Binder)

The binder is not particularly restricted, and a material having favorable solubility or dispersibility in a solvent is selected. Specific examples thereof include resin-based polymers, such as polyethylene, polypropylene, polyethylene terephthalate, polymethyl methacrylate, polyimide, aromatic polyamide, cellulose, and nitrocellulose; rubber-like polymers, such as SBR (styrene-butadiene rubber), NBR (acrylonitrile-butadiene rubber), fluororubber, isoprene rubber, butadiene rubber, and ethylene-propylene rubber; thermoplastic elastomer-like polymers, such as styrene-butadiene-styrene block copolymers and hydrogenation products thereof, EPDM (ethylene-propylene-diene terpolymers), and styrene-isoprene-styrene block copolymers and hydrogenation products thereof; soft resin-like polymers, such as syndiotactic 1,2-polybutadiene, polyvinyl acetate, ethylene-vinyl acetate copolymers, and propylene-α-olefin copolymers; fluorine-based polymers, such as polyvinylidene fluoride (PVdF), polytetrafluoroethylene, fluorinated polyvinylidene fluoride, polytetrafluoroethylene-ethylene copolymers, and polytetrafluoroethylene-vinylidene fluoride copolymers; copolymers in which acrylic acid and a linear ether group are added to a polyacrylonitrile skeleton; and polymer compositions having ion conductivity of alkali metal ions (particularly lithium ions). These binders may be used singly, or in combination of two or more thereof. From the standpoint of attaining high adhesion, it is preferred to use a polyvinylidene fluoride (PVdF), or a copolymer in which acrylic acid and a linear ether group are added to a polyacrylonitrile skeleton, along with the positive electrode and the negative electrode and, from the standpoint of further improving the charge-discharge cycle characteristics, it is more preferred to use a copolymer in which acrylic acid and a linear ether group are added to a polyacrylonitrile skeleton.

The range of the content ratio of the binder based on the total solid content of the positive electrode mixture is as follows. From the standpoint of adequately binding the positive electrode active material to attain a sufficient mechanical strength of the positive electrode and to stabilize the battery performances such as charge-discharge cycle characteristics, the lower limit of the range is preferably 0.1% by mass or higher, more preferably 1% by mass or higher, still more preferably 2% by mass or higher. From the standpoint of further improving the battery capacity and the electrical conductivity, the upper limit is preferably 30% by mass or less, more preferably 20% by mass or less, still more preferably 10% by mass or less.

The content ratio of the binder based on the total solid content of the positive electrode mixture is thus preferably from 0.1% by mass to 30% by mass, more preferably from 1% by mass to 20% by mass, still more preferably from 2% by mass to 10% by mass.

The content ratio of the binder based on the total solid content of the negative electrode mixture is as follows. From the standpoint of adequately binding the negative electrode active material to attain a sufficient mechanical strength of the negative electrode and to stabilize the battery performances such as charge-discharge cycle characteristics, the lower limit of the range is preferably 0.1% by mass or higher, more preferably 0.5% by mass or higher, still more preferably 1% by mass or higher. From the standpoint of further improving the battery capacity and the electrical conductivity, the upper limit is preferably 40% by mass or less, more preferably 25% by mass or less, still more preferably 15% by mass or less.

The content ratio of the binder based on the total solid content of the negative electrode mixture is thus preferably from 0.1% by mass to 40% by mass, more preferably from 0.5% by mass to 25% by mass, still more preferably from 1% by mass to 15% by mass.

As a solvent for dispersing the above-described active materials, conductive agents, binders and the like, an organic solvent such as N-methyl-2-pyrrolidone can be used.

(Current Collector)

A current collector is used in the positive electrode and the negative electrode. Examples of a current collector material that can be used as a positive electrode current collector include aluminum, titanium, stainless steel, nickel, and electrically conductive polymers, as well as aluminum and copper, whose surface has been subjected to a treatment of adhering thereto carbon, nickel, titanium, silver or the like for the purpose of improving the adhesion, electrical conductivity and oxidation resistance.

Examples of a current collector material that can be used as a negative electrode current collector include copper, stainless steel, nickel, aluminum, titanium, electrically conductive polymers and aluminum-cadmium alloys, as well as copper and aluminum, whose surface has been subjected to a treatment of adhering thereto carbon, nickel, titanium, silver or the like for the purpose of improving the adhesion, electrical conductivity and reduction resistance.

(Separator)

The separator is not particularly restricted as long as it has ion permeability while providing electronic insulation between the positive electrode and the negative electrode and is resistant against oxidization on the positive electrode side and reduction on the negative electrode side. As a material of the separator satisfying such properties, a resin, an inorganic substance or the like may be used.

As the resin, for example, an olefin-based polymer, a fluorocarbon polymer, a cellulose-based polymer, a polyimide, or nylon may be used. Specifically, the resin is preferably selected from those materials that are stable against electrolytic solutions and exhibit excellent liquid retention, and it is preferred to use a porous sheet, a nonwoven fabric or the like that is made from a polyolefin, such as a polyethylene or a polypropylene.

As the inorganic substance, for example, an oxide (e.g., alumina or silicon dioxide), a nitride (e.g., aluminum nitride or silicon nitride), a sulfate (e.g., barium sulfate or calcium sulfate), or glass may be used. For example, a thin film-form substrate, such as a nonwoven fabric, a woven fabric or a microporous film, on which the inorganic substance in a fiber form or a particle form is adhered, can be used as the separator.

As the thin film-form substrate, one having a pore size of from 0.01 μm to 1 μm and a thickness of from 5 μm to 50 μm is suitably used. For example, a composite porous layer obtained by using the inorganic substance in a fiber form or a particle form with a binder such as a resin can be used as a separator. Further, such a composite porous layer may be formed as the separator on the surface of the positive electrode or the negative electrode. Alternatively, this composite porous layer may be formed on the surface of other separator, and the resultant may be used as a multilayer separator. For example, a composite porous layer in which alumina particles having a 90% particle size (D90) of smaller than 1 μm are bound using a fluorocarbon resin as a binder may be formed on the surface of the positive electrode or on the separator surface facing the positive electrode.

(Electrolytic Solution)

The electrolytic solution according to the first embodiment contains a lithium salt (electrolyte) and a non-aqueous solvent dissolving the lithium salt.

The non-aqueous solvent used in the first embodiment contains dimethyl carbonate, and the content ratio of dimethyl carbonate is higher than 70% by volume with respect to the total amount of non-aqueous solvent(s). When the content ratio of dimethyl carbonate is higher than 70% by volume with respect to the total amount of non-aqueous solvent(s), the charge-discharge cycle characteristics tend to be improved.

The content ratio of dimethyl carbonate with respect to the total amount of non-aqueous solvent(s) is preferably 75% by volume or higher, more preferably 85% by volume or higher, still more preferably 90% by volume or higher. The content ratio of dimethyl carbonate with respect to the total amount of non-aqueous solvent(s) may be 100% by volume; however, from the standpoint of further improving the safety, it is preferably 95% by volume or less.

In the first embodiment, a non-aqueous solvent other than dimethyl carbonate may also be used in combination.

Examples of other non-aqueous solvent include ethylene carbonate (EC), diethyl carbonate (DEC), propylene carbonate (PC), trifluoroethyl phosphate (TFEP), ethyl methyl sulfone (EMS), vinylene carbonate (VC), methyl ethyl carbonate, γ-butyrolactone, acetonitrile, 1,2-dimethoxyethane, dimethoxymethane, tetrahydrofuran, dioxolane, methylene chloride, and methyl acetate.

In cases where other non-aqueous solvent is used in combination with dimethyl carbonate, the content ratio of the other non-aqueous solvent with respect to the total amount of non-aqueous solvents is preferably lower than 30% by volume, more preferably 25% by volume or lower, still more preferably 15% by volume or lower, particularly preferably 10% by volume or lower. The content ratio of the other non-aqueous solvent may be 0% by volume; however, from the standpoint of further improving the safety, it is preferably 5% by volume or higher.

The electrolytic solution can be made safe by using a high-flash-point solvent such as EC, TFEP, or EMS; however, such a compound may have poor reduction resistance. Therefore, when a non-aqueous solvent other than DMC is used, as long as the content ratio of such a compound is lower than 30% by volume with respect to the total amount of the non-aqueous solvents, deterioration of the charge-discharge cycle characteristics tends to be suppressed.

Examples of the lithium salt include $LiPF_6$ (lithium hexafluorophosphate), $LiBF_4$, LiFSI (lithium bisfluorosulfonylimide), LiTFSI (lithium bistrifluoromethane sulfonylimide), $LiClO_4$, $LiB(C_6H_5)_4$, $LiCH_3SO_3$, $LiCF_3SO_3$, $LiN(SO_2F)_2$, $LiN(SO_2CF_3)_2$, and $LiN(SO_2CF_2CF_3)_2$. These lithium salts may be used singly, or in combination of two or more thereof.

Thereamong, lithium hexafluorophosphate is preferred, comprehensively assessing the solubility in solvents as well as the charge-discharge characteristics, input-output characteristics, charge-discharge cycle characteristics and the like that are attained by the use thereof in a lithium ion secondary battery.

From the safety standpoint, the concentration of the lithium salt in the electrolytic solution is preferably from 0.8 mol/L to 2.0 mol/L, more preferably from 1.0 mol/L to 2.0 mol/L, still more preferably from 1.2 mol/L to 2.0 mol/L. By controlling the concentration of the lithium salt to be high at 1.2 mol/L to 2.0 mol/L, the flash point is increased, and the electrolytic solution can thus be made safer.

The electrolytic solution may also contain an additive(s) as required.

The additives are not particularly restricted as long as they are additives for electrolytic solutions of lithium ion secondary batteries, and examples thereof include nitrogen-containing heterocyclic compounds, sulfur-containing heterocyclic compounds, heterocyclic compounds containing nitrogen and sulfur, cyclic carboxylic acid esters, fluorine-containing cyclic carbonates, fluorine-containing boric acid esters, and other compounds having an unsaturated bond(s) in their molecules. In addition to these additives, other additive(s) such as an overcharge inhibitor, a negative electrode film-forming agent, a positive electrode-protecting agent, and/or a high input-output agent may also be used depending on the desired functions.

By incorporating such additives into the electrolytic solution, the storage characteristics at high temperatures, the charge-discharge cycle characteristics, and the input-output characteristics can be improved.

(Capacity Ratio Between Negative Electrode Capacity of Negative Electrode and Positive Electrode Capacity of Positive Electrode)

In the first embodiment, from the standpoints of the charge-discharge cycle characteristics and the energy density, the capacity ratio (negative electrode capacity/positive electrode capacity) is set at 1 or lower. When the capacity ratio (negative electrode capacity/positive electrode capacity) is higher than 1, the positive electrode potential is increased, so that the charge-discharge cycle characteristics tend to be deteriorated. With the capacity ratio (negative electrode capacity/positive electrode capacity) being 1 or lower, degradation reaction of the electrolytic solution caused by an increase in the positive electrode potential is unlikely to occur, so that the lithium ion secondary battery tends to have favorable charge-discharge cycle characteristics.

The capacity ratio (negative electrode capacity/positive electrode capacity) is preferably from 0.6 to lower than 1. When the capacity ratio is 0.6 or higher, the battery capacity is increased, so that the volume energy density tends to be increased as well. The capacity ratio (negative electrode capacity/positive electrode capacity) is preferably from 0.7 to 0.98 and, from the standpoints of the volume energy density and the input characteristics, it is more preferably from 0.75 to 0.95.

It is noted here that the terms "positive electrode capacity" and "negative electrode capacity" used herein each mean a maximum capacity that can be reversibly utilized, which is obtained when an electrochemical cell is constructed using metal lithium as a counter electrode and is subjected to constant-current charging and constant-current discharging.

The negative electrode capacity represents [discharge capacity of negative electrode], while the positive electrode capacity represents [discharge capacity of positive electrode].

The [discharge capacity of negative electrode] is defined as a discharge capacity determined using a charge-discharge apparatus when lithium ions introduced to a negative electrode active material are released. Further, the [discharge capacity of positive electrode] defined as a discharge capacity determined using a charge-discharge apparatus when lithium ions are introduced to a positive electrode active material.

For example, when a spinel-type lithium-nickel-manganese composite oxide is used as the positive electrode active material and LTO is used as the negative electrode active material, the "positive electrode capacity" and the "negative electrode capacity" are each a capacity that is obtained by subjecting the above-described electrochemical cell to charging and discharging at a current density of 0.1 mA/cm$^2$ in both constant-current charging and constant-current discharging in voltage ranges of from 4.95 V to 3.5 V and from 1.0 V to 2.0 V, respectively.

In the electrochemical cell, the direction in which lithium ions are introduced to the negative electrode active material (e.g., lithium-titanium composite oxide) is defined as "charging", while the direction in which lithium ions are released therefrom is defined as "discharging". Further, in the electrochemical cell, the direction in which lithium ions are released from a lithium-nickel-manganese composite oxide used as the positive electrode active material is defined as "charging", while the direction in which lithium ions are introduced thereto is defined as "discharging".

In the first embodiment, the positive electrode capacity tends to be increased by increasing the amount of the positive electrode active material contained in the positive electrode, or decreased by reducing the amount of the positive electrode active material contained in the positive electrode. In the same manner as the positive electrode capacity, the negative electrode capacity is increased or decreased depending on the amount of the negative electrode active material. By adjusting the positive electrode capacity and the negative electrode capacity, the capacity ratio (negative electrode capacity/positive electrode capacity) of the lithium ion secondary battery of the first embodiment can be adjusted to be 1 or lower.

As the shape of the lithium ion secondary battery of the first embodiment, various shapes of a cylindrical type, a layered type, a coin type, a laminated type and the like can be adopted. Regardless of the shape, the lithium ion secondary battery is completed by inserting a separator between a positive electrode and a negative electrode to form an electrode body, connecting positive electrode and negative electrode current collectors with positive electrode and negative electrode terminals extending therefrom to the outside, respectively, using current collection leads or the like, and then tightly sealing the electrode body in a battery case along with an electrolytic solution.

A layered-type lithium ion secondary battery, in which a positive electrode plate and a negative electrode plate are layered with a separator inserted therebetween, is described below as the first embodiment; however, the first embodiment is not restricted thereto.

Figure 1:
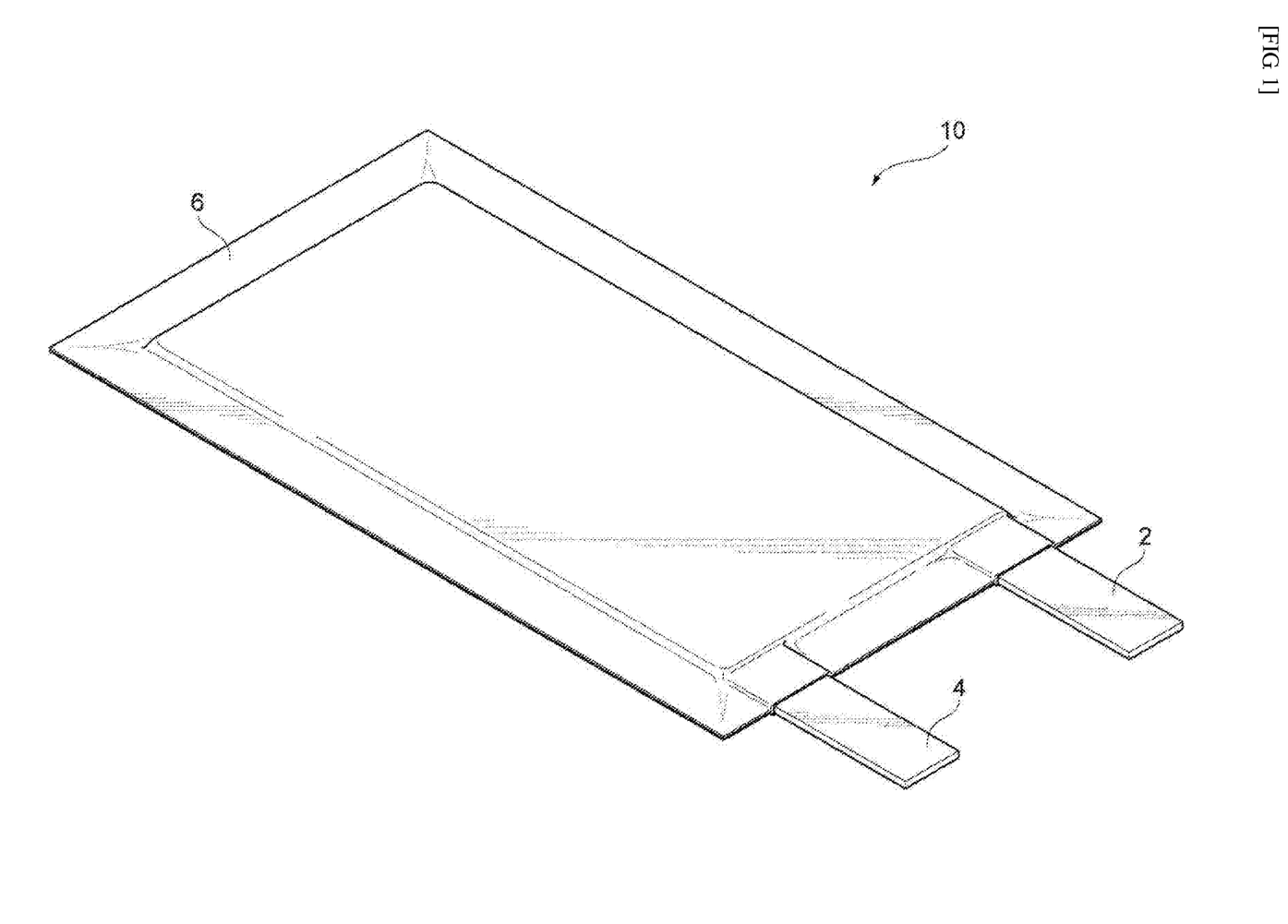
FIG. 1 is a perspective view illustrating one example of the lithium ion secondary battery of the present embodiment.
Figure 2:
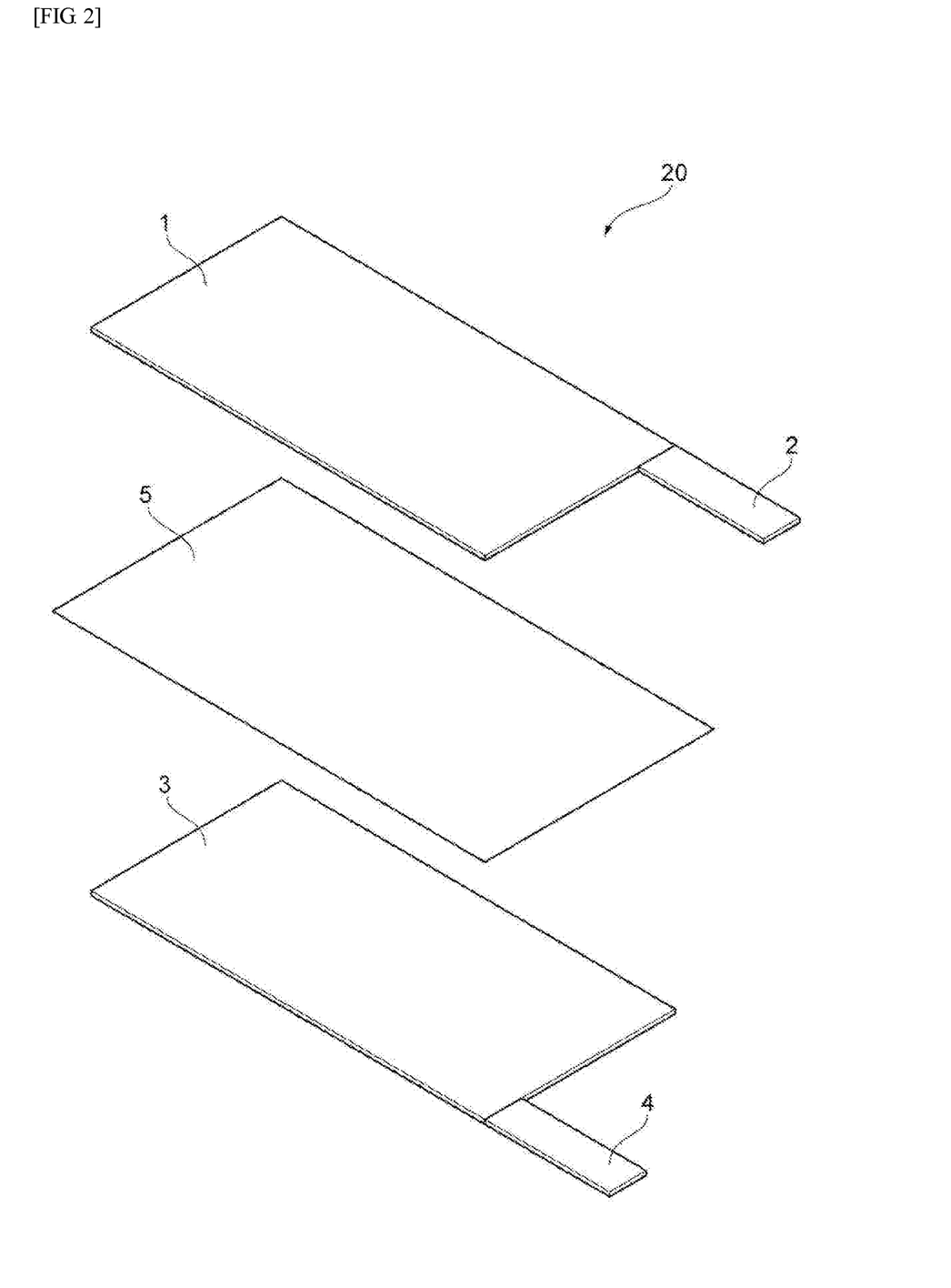
FIG. 2 is a perspective view illustrating a positive electrode plate, a negative electrode plate and a separator, which constitute an electrode assembly.

FIG. 1 is a perspective view illustrating one example of the lithium ion secondary battery of the first embodiment. FIG. 2 is a perspective view illustrating a positive electrode plate, a negative electrode plate and a separator, which constitute an electrode assembly.

It is noted here that the sizes of the members illustrated in these figures are conceptual, and the relationship of the relative sizes between the members is not restricted thereto. Further, members having substantially the same function are assigned with the same symbols in all of the figures, and redundant descriptions thereof may be omitted.

In a lithium ion secondary battery 10 illustrated in FIG. 1, an electrode assembly 20 and an electrolytic solution are housed in a battery casing 6 made of a laminate film, and a positive electrode current collector tab 2 and a negative electrode current collector tab 4 are extracted out of the battery casing.

As illustrated in FIG. 2, in the electrode assembly 20, a positive electrode plate 1 attached with the positive electrode current collector tab 2, a separator 5, and a negative electrode plate 3 attached with the negative electrode current collector tab 4 are disposed in layers.

The sizes, shapes and the like of the positive electrode plate, the negative electrode plate, the separator, the electrode assembly and the battery may be selected arbitrarily and are not restricted to those illustrated in FIGS. 1 and 2.

Examples of the material of the battery casing 6 include an aluminum laminate film, SUS, aluminum, copper, and stainless steel.

Examples of other embodiments of the lithium ion secondary battery include a cylindrical lithium ion secondary battery in which an electrode assembly that is obtained by winding a laminated body formed by disposing a positive electrode plate and a negative electrode plate in layers via a separator inserted therebetween is enclosed in a cylinder-shaped battery casing.

Figure 3:
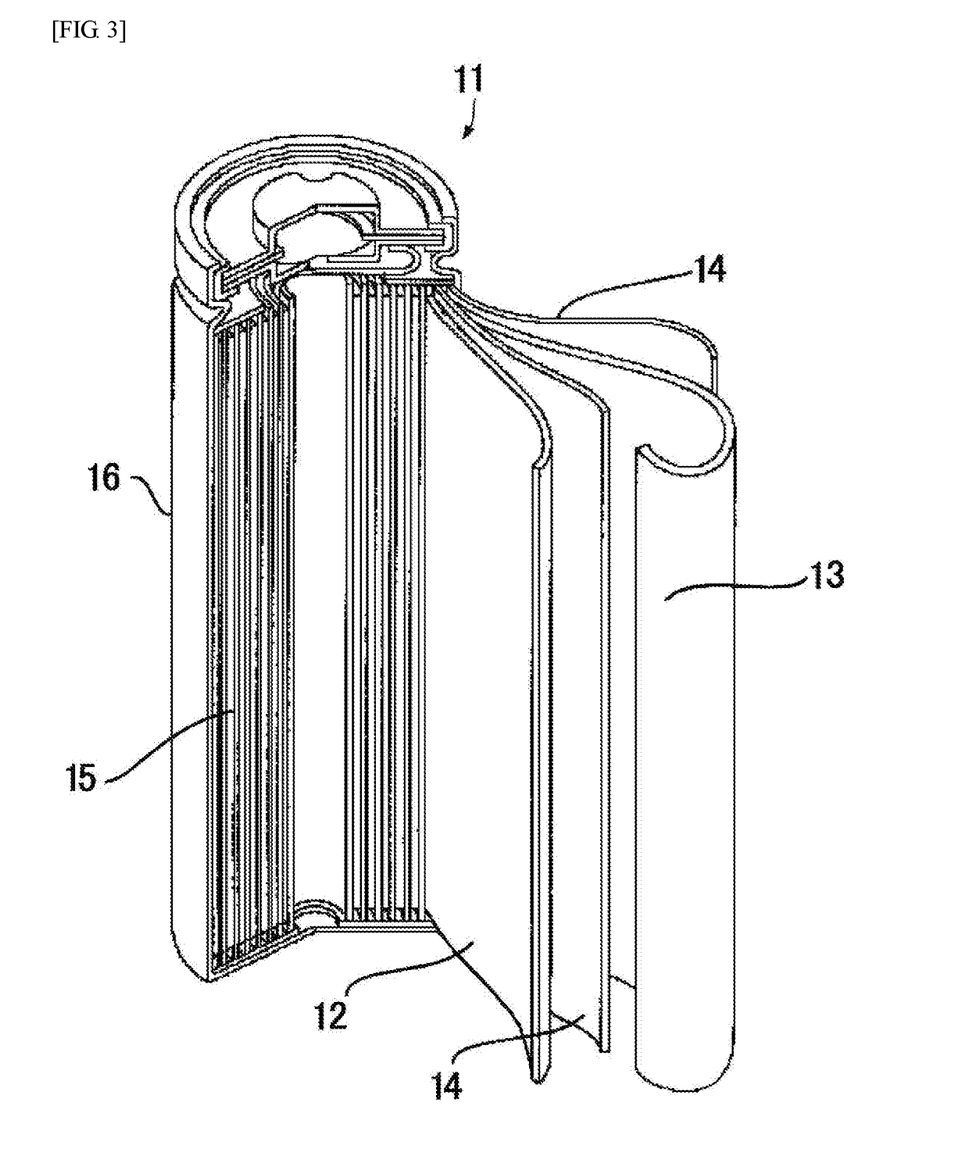
FIG. 3 is a cross-sectional view showing other configuration of the lithium ion secondary battery of the present embodiment.

FIG. 3 is a cross-sectional view illustrating other configuration of the lithium ion secondary battery of this embodiment.

As illustrated in FIG. 3, a lithium ion secondary battery 11 has a closed-bottom cylindrical battery casing 16 made of nickel-plated steel. In the battery casing 16, an electrode assembly 15 is housed. In the electrode assembly 15, a positive electrode plate 12 and a negative electrode plate 13, which are both in a strip form, are spirally wound in a cross-section via a separator 14, which is a polyethylene porous sheet. The separator 14 is configured to have, for example, a width of 58 mm and a thickness of 20 On the upper end surface of the electrode assembly 15, a ribbon-form positive electrode tab terminal, which is made of aluminum and fixed with the positive electrode plate 12 at one end, protrudes. The other end of the positive electrode tab terminal is bonded by ultrasonic welding to the lower surface of a disk-shaped battery cover, which is arranged on the upper side of the electrode assembly 15 and functions as a positive electrode external terminal. Meanwhile, on the lower end surface of the electrode assembly 15, a ribbon-form negative electrode tab terminal, which is fixed with the negative electrode plate 13 at one end, protrudes. The other end of the negative electrode tab terminal is bonded by resistance welding to the inner bottom part of the battery casing 16. Accordingly, the positive electrode tab terminal and the negative electrode tab terminal are arranged on the opposite sides from each other at the respective end surfaces of the electrode assembly 15. It is noted here that insulation coating (not illustrated) is applied to the entirety of the outer circumferential surface of the electrode assembly 15. The battery cover is fixed by caulking on top of the battery casing 16 via an insulating resin gasket. Therefore, the inside of the lithium ion secondary battery 11 is hermetically sealed. Further, an electrolytic solution (not illustrated) is injected into the battery casing 16.

The sizes, shapes and the like of the positive electrode plate, the negative electrode plate, the separator, the electrode assembly and the battery may be selected arbitrarily and are not restricted to those illustrated in FIG. 3.

Second Embodiment

A lithium ion secondary battery of a second embodiment includes a positive electrode containing a spinel-type lithium-nickel-manganese composite oxide as a positive electrode active material; a negative electrode containing a lithium-titanium composite oxide as a negative electrode active material; a separator inserted between the positive electrode and the negative electrode; and an electrolytic solution, wherein a capacity ratio of a negative electrode capacity of the negative electrode to a positive electrode capacity of the positive electrode (negative electrode capacity/positive electrode capacity) is 1 or lower, and the electrolytic solution contains dimethyl carbonate as a non-aqueous solvent at a content ratio of higher than 70% by volume with respect to the total amount of non-aqueous solvent(s).

In the lithium ion secondary battery of the second embodiment, the same constitution as that of the lithium ion secondary battery of the first embodiment can be adopted except that a lithium-titanium composite oxide is used as the negative electrode active material, and preferred material types, preferred numerical ranges and the like are also the same.

Embodiments of the lithium ion secondary battery of the invention have been described above; however, the above-described embodiments are merely examples, and the lithium ion secondary battery of the invention can be carried out in various configuration where various modifications and improvements are made based on the knowledge of a person of ordinary skill in the art, including the above-described embodiments.

According to the invention, a lithium ion secondary battery which exhibits excellent charge-discharge cycle characteristics even with the use of a positive electrode active material showing a high operating potential can be provided.

EXAMPLES

The present embodiment is described below in more detail by way of examples thereof. It is noted here, however, that the invention is not restricted to the following examples.

Example 1

As for a positive electrode, 93 parts by mass of a spinel-type lithium-nickel-manganese composite oxide (LiNi$_{0.5}$Mn$_{1.5}$O$_4$, BET specific surface area: 0.31 m$^2$/g, median diameter D50: 16.9 μm) as a positive electrode active material, 5 parts by mass of acetylene black (manufactured by Denka Co., Ltd.) as a conductive agent, and 2 parts by mass of a copolymer obtained by adding acrylic acid and a linear ether group to a polyacrylonitrile skeleton (the below-described binder resin composition of Synthesis Example 1) as a binder were mixed, and an appropriate amount of N-methyl-2-pyrrolidone was added thereto, after which the resultant was kneaded to obtain a paste-form slurry of a positive electrode mixture. This slurry was applied to one side of a 20 μm-thick aluminum foil, which was used as a current collector for the positive electrode, in a substantially uniform and homogeneous manner such that the slurry was coated in an amount of 140 g/m$^2$ in terms of the solid content of the positive electrode mixture. Subsequently, the resultant was subjected to a drying treatment to obtain a dry coating film. This dry coating film was pressed and thereby compacted to a density of 2.3 g/cm$^3$ in terms of the solid content of the positive electrode mixture, whereby a sheet-form positive electrode was prepared. A layer thereof containing the positive electrode mixture had a thickness of 60 μm. This sheet-form positive electrode was cut into a size of 31 mm in width and 46 mm in length to prepare a positive electrode plate, and a positive electrode current collector tab was attached to this positive electrode plate as illustrated in FIG. 2.

As for a negative electrode, 91 parts by mass of lithium titanate (LTO, BET specific surface area: 6.5 m$^2$/g, median diameter D50: 7.3 μm), which is a lithium-titanium composite oxide and was used as a negative electrode active material, 4 parts by mass of acetylene black (manufactured by Denka Co., Ltd.) as a conductive agent, and 5 parts by mass of polyvinylidene fluoride as a binder were mixed, and an appropriate amount of N-methyl-2-pyrrolidone was added thereto, after which the resultant was kneaded to obtain a paste-form slurry of a negative electrode mixture. This slurry was applied to one side of a 10 μm-thick copper foil, which was used as a current collector for the negative electrode, such that the slurry was coated in an amount of 85 g/m$^2$ in terms of the solid content of the negative electrode mixture. Subsequently, the resultant was subjected to a drying treatment to obtain a dry coating film. This dry coating film was pressed and thereby compacted to a density of 1.9 g/cm$^3$ in terms of the solid content of the negative electrode mixture, whereby a sheet-form negative electrode was prepared. A layer thereof containing the negative electrode mixture had a thickness of 45 This sheet-form negative electrode was cut into a size of 30 mm in width and 45 mm in length to prepare a negative electrode plate, and a negative electrode current collector tab was attached to this negative electrode plate as illustrated in FIG. 2.

Synthesis Examples of the binder used in the positive electrode are described below.

Synthesis Example 1

To a 3-L separable flask equipped with a stirrer, a thermometer, a condenser and a nitrogen gas-introducing tube, 1,804 g of purified water was added, and the temperature thereof was raised to 74° C. with stirring under nitrogen gas aeration of 200 ml/min, after which the nitrogen gas aeration was terminated. Then, an aqueous solution prepared by dissolving 0.968 g of ammonium persulfate (polymerization initiator) in 76 g of purified water was added and, immediately thereafter, a mixed solution of 183.8 g of acrylonitrile (nitrile group-containing monomer), 9.7 g of acrylic acid (carboxyl group-containing monomer, at a ratio of 0.039 mole per 1 mole of acrylonitrile) and 6.5 g of methoxy triethylene glycol acrylate (trade name: NK ESTER AM-30G, manufactured by Shin-Nakamura Chemical Co., Ltd.; monomer, at a ratio of 0.0085 mole per 1 mole of acrylonitrile) was further added dropwise over a period of 2 hours while maintaining the temperature of the system at 74±2° C. Subsequently, to the resulting suspended reaction system, an aqueous solution prepared by dissolving 0.25 g of ammonium persulfate in 21.3 g of purified water was added and, after raising the temperature of the reaction system to 84° C., the reaction was allowed to proceed for 2.5 hours while maintaining the temperature of the system at 84±2° C. Thereafter, the reaction system was allowed to cool to 40° C. over a period of 1 hour and, after stirring was stopped, the reaction system was further allowed to cool overnight at room temperature, whereby a reaction solution in which a binder resin composition had precipitated was obtained. This reaction solution was suction-filtered, and the recovered precipitates in a wet state were washed three times with 1,800 g of purified water, after which the precipitates were vacuum-dried at 80° C. for 10 hours, whereby the precipitates were isolated and purified and the binder resin composition was obtained.

(Preparation of Electrode Assembly)

A layered electrode assembly was prepared by arranging the above-prepared positive electrode plate and negative electrode plate to face each other via a separator made of a polyethylene microporous film having a thickness of 30 μm, a width of 35 mm and a length of 50 mm.

(Preparation of Electrolytic Solution)

An electrolyte, LiPF$_6$, was dissolved in the non-aqueous solvents shown in Table 1 below at the concentration shown in Table 1 to prepare an electrolytic solution.

(Production of Lithium Ion Secondary Battery)

As illustrated in FIG. 1, the above-prepared electrode assembly was housed in a battery casing constituted by an aluminum laminate film and, after injecting the above-prepared electrolytic solution into this battery casing, the opening of the battery container was sealed in such a manner that the positive electrode current collector tab and the negative electrode current collector tab protruded to the outside, whereby a lithium ion secondary battery of Example 1 was produced. It is noted here that the aluminum laminate film was a layered body of a polyethylene terephthalate (PET) film/an aluminum foil/a sealant layer (e.g., polypropylene).

(Measurement of Positive Electrode Capacity and Negative Electrode Capacity)

—Measurement of Positive Electrode Capacity—

A counter electrode was prepared by pasting a 0.5 mm-thick lithium foil cut into a size of 31 mm in width and 46 mm in length to a copper mesh cut into a size of 31 mm in width and 46 mm in length. To this counter electrode, a current collector tab was attached. Then, a layered electrode assembly was prepared by arranging the above-prepared positive electrode plate and counter electrode to face each other via a separator made of a polyethylene microporous film having a thickness of 30 μm, a width of 35 mm and a length of 50 mm. As illustrated in FIG. 1, the thus obtained electrode assembly was housed in a battery casing constituted by an aluminum laminate film and, after injecting an electrolytic solution into this battery casing, the opening of the battery casing was sealed in such a manner that the positive electrode current collector tab and the current collector tab of the counter electrode protruded to the outside, whereby a lithium ion secondary battery was produced. It is noted here that the aluminum laminate film was a layered body of a polyethylene terephthalate (PET) film/an aluminum foil/a sealant layer (e.g., polypropylene). As the electrolytic solution, an EC/DMC mixed solvent (EC: DMC=3:7 in terms of volume ratio) having a LiPF$_6$ concentration of 1.2 mol/L was used. The positive electrode capacity was evaluated as the discharge capacity obtained by performing charging and discharging in a voltage range of from 4.95 V to 3.5 V with the current density being set at 3.5 mA/cm$^2$ during constant-current charging and constant-current discharging.

As a measurement result, the positive electrode of Example 1 was found to have a capacity of 24 mAh.

—Measurement of Negative Electrode Capacity—

The negative electrode capacity was measured in the same manner as in the measurement of the positive electrode capacity, except that the above-prepared negative electrode plate was used in place of the positive electrode plate, and that the evaluation was carried out by performing charging and discharging in a voltage range of from 1.0 V to 2.0 V with the current density being set at 3.5 mA/cm² during constant-current charging and constant-current discharging.

As a measurement result, the negative electrode of Example 1 was found to have a capacity of 17 mAh.

From the thus measured positive electrode capacity and negative electrode capacity for Example 1, the capacity ratio (negative electrode capacity/positive electrode capacity) was calculated to be 0.7.

Examples 2 to 12, and Comparative Examples 1 to 5

Lithium ion secondary batteries of Examples 2 to 12 and Comparative Examples 1 to 5 were produced and evaluated in the same manner as in Example 1, except that the formulation of non-aqueous solvents and the LiPF$_6$ concentration were changed as shown in Table 1. The thus obtained evaluation results are shown in Table 1.

It is noted here that, for Example 3, Example 8, Comparative Example 4 and Comparative Example 5, the amount of the negative electrode mixture coated on one side and the density of the negative electrode mixture were changed while the amount of the positive electrode mixture coated on one side and the density of the positive electrode mixture were fixed, such that the respective capacity ratios (negative electrode capacity/positive electrode capacity) shown in Table 1 were obtained.

(Charge-Discharge Cycle Characteristic: Cases with Capacity Ratio (Negative Electrode Capacity/Positive Electrode Capacity) of Lower than 1)

Using a charge-discharge apparatus (BATTERY TEST UNIT, manufactured by IEM), the above-described lithium ion secondary batteries were each charged with a constant current at a temperature of 25° C., a current value of 0.2 C, and an end-of-charge voltage of 3.4 V. It is noted here that "C" used as the unit of the current value means "current value (A)/battery capacity (Ah)". After a 15-minute rest, constant-current discharging of each lithium ion secondary battery was repeated twice at a current value of 0.2 C and an end-of-discharge voltage of 2.0 V, followed by constant-current charging at a temperature of 50° C., a current value of 1 C and an end-of-charge voltage of 3.5 V and subsequent another 15-minute rest, after which constant-current discharging was performed at a current value of 1 C and an end-of-discharge voltage of 2.0 V. The discharge capacity measured at this point was defined as the initial discharge capacity, and the discharge capacity was measured after repeating the above-described operations 200 times (discharge capacity after 200 cycles). Then, the degradation rate after 200 cycles was calculated as a charge-discharge characteristic using the following equation. The results thereof are shown in Table 1.

Charge-discharge cycle characteristic (%)=(Discharge capacity after 200 cycles/Initial discharge capacity)×100

(Charge-Discharge Cycle Characteristic: Cases with Capacity Ratio (Negative Electrode Capacity/Positive Electrode Capacity) of 1 or Higher)

The charge-discharge cycle characteristic was calculated in the same manner as in the cases where the capacity ratio (negative electrode capacity/positive electrode capacity) was lower than 1, except that the end-of-charge voltage in the constant-current charging performed at a temperature of 25° C. and a current value of 0.2 C was changed to 3.3 V and the end-of-charge voltage in the constant-current charging performed at a temperature of 50° C. and a current value of 1 C was changed to 3.4 V. The results thereof are shown in Table 1.

TABLE 1

|  | Non-aqueous solvent (% by volume) | | | | | LiPF$_6$ concentration (mol/L) | Cycle property (%) | Capacity ratio (negative electrode capacity/positive electrode capacity) |
| --- | --- | --- | --- | --- | --- | --- | --- | --- |
|  | EC | TFEP | EMS | DMC | DEC | | | |
| Example 1 | 15 | — | — | 85 | — | 1.0 | 96 | 0.7 |
| Example 2 | — | — | — | 100 | — | 1.2 | 100 | 0.7 |
| Example 3 | 10 | — | — | 90 | — | 1.2 | 100 | 0.8 |
| Example 4 | 17 | — | — | 83 | — | 1.2 | 95 | 0.7 |
| Example 5 | 20 | — | — | 80 | — | 1.7 | 91 | 0.7 |
| Example 6 | 5 | — | — | 95 | — | 2.0 | 100 | 0.7 |
| Example 7 | — | — | — | 100 | — | 2.0 | 100 | 0.7 |
| Example 8 | 10 | — | — | 90 | — | 2.0 | 100 | 0.9 |
| Example 9 | — | — | 5 | 95 | — | 2.0 | 100 | 0.7 |
| Example 10 | — | 5 | — | 95 | — | 2.0 | 95 | 0.7 |
| Example 11 | 10 | — | — | 90 | — | 2.0 | 100 | 0.7 |
| Example 12 | 25 | — | — | 75 | — | 1.2 | 85 | 0.7 |
| Comparative Example 1 | 30 | — | — | 70 | — | 1.2 | 80 | 0.7 |
| Comparative Example 2 | 50 | — | — | 50 | — | 1.2 | 0 | 0.7 |
| Comparative Example 3 | 10 | — | — | — | 90 | 1.0 | 40 | 0.7 |
| Comparative Example 4 | 10 | — | — | 90 | — | 1.0 | 50 | 1.1 |
| Comparative Example 5 | 10 | — | — | 90 | — | 1.0 | 50 | 1.2 |

In Table 1, "-" indicates the absence of the corresponding component, and "Cycle property" means "charge-discharge cycle characteristic".

It can be confirmed that, in Examples 1 to 12 where the capacity ratio (negative electrode capacity/positive electrode capacity) was 1 or lower and the DMC content ratio was higher than 70% by volume with respect to the total amount of the non-aqueous solvent(s), a superior charge-discharge cycle characteristic was attained as compared to Comparative Examples 1 and 2 where the DMC content ratio was 70% by mass or lower with respect to the total amount of the non-aqueous solvents, Comparative Example 3 where the DEC content ratio was 90% by mass with respect to the total amount of the non-aqueous solvents, and Comparative Examples 4 and 5 where the capacity ratio (negative electrode capacity/positive electrode capacity) was higher than 1 and the DMC content ratio was 90% by mass with respect to the total amount of the non-aqueous solvents.

The disclosures of Japanese Patent Application No. 2015-218153 filed on Nov. 6, 2015, is hereby incorporated by reference in its entirety.

All the documents, patent applications and technical standards that are described in the present specification are hereby incorporated by reference to the same extent as if each individual document, patent application or technical standard is concretely and individually described to be incorporated by reference.

DESCRIPTION OF SYMBOLS 1 and 12: positive electrode plate
2: positive electrode current collector tab
3 and 13: negative electrode plate
4: negative electrode current collector tab
5 and 14: separator
6 and 16: battery casing
10 and 11: lithium ion secondary battery
15 and 20: electrode assembly

The invention claimed is:

1. A lithium ion secondary battery, comprising:
a positive electrode comprising a spinel-type lithium-nickel-manganese composite oxide as a positive electrode active material;
a negative electrode comprising, as a negative electrode active material, an active material in which introduction and release of lithium ions take place at a potential of 1.2 V or higher relative to a lithium potential;
a separator inserted between the positive electrode and the negative electrode; and
an electrolytic solution, wherein:
a capacity ratio of a negative electrode capacity of the negative electrode to a positive electrode capacity of the positive electrode (negative electrode capacity/ positive electrode capacity) is from 0.6 to less than 1, and
the electrolytic solution comprises a non-aqueous solvent comprising lithium hexafluorophosphate and dimethyl carbonate, wherein a content ratio of dimethyl carbonate is 83% by volume or higher with respect to a total amount of the non-aqueous solvent.

2. The lithium ion secondary battery according to claim 1, wherein the spinel-type lithium-nickel-manganese composite oxide comprises a compound represented by $LiNi_xMn_{2-x}O_4$, wherein $0.3<X<0.7$.

3. The lithium ion secondary battery according to claim 1, wherein the spinel-type lithium-nickel-manganese composite oxide has a BET specific surface area of less than 2.9 $m^2/g$.

4. The lithium ion secondary battery according to claim 1, wherein the spinel-type lithium-nickel-manganese composite oxide has a BET specific surface area of 0.05 $m^2/g$ or larger.

5. The lithium ion secondary battery according to claim 1, wherein particles of the spinel-type lithium-nickel-manganese composite oxide have a median diameter D50 of from 0.5 µm to 100 µm.

6. The lithium ion secondary battery according to claim 1, wherein the negative electrode active material, in which introduction and release of lithium ions take place at a potential of 1.2 V or higher relative to the lithium potential, has a BET specific surface area of less than 40 $m^2/g$.

7. The lithium ion secondary battery according to claim 1, wherein the negative electrode active material, in which introduction and release of lithium ions take place at a potential of 1.2 V or higher relative to the lithium potential, has a BET specific surface area of 0.1 $m^2/g$ or larger.

8. The lithium ion secondary battery according to claim 1, wherein particles of the negative electrode active material, in which introduction and release of lithium ions take place at a potential of 1.2 V or higher relative to the lithium potential, have a median diameter D50 of from 0.5 µm to 100 µm.

9. The lithium ion secondary battery according to claim 1, wherein a content ratio of propylene carbonate is 0% by volume with respect to a total amount of the non-aqueous solvent.

10. A lithium ion secondary battery, comprising:
a positive electrode comprising a spinel-type lithium-nickel-manganese composite oxide as a positive electrode active material;
a negative electrode comprising a lithium-titanium composite oxide as a negative electrode active material;
a separator inserted between the positive electrode and the negative electrode; and
an electrolytic solution, wherein:
a capacity ratio of a negative electrode capacity of the negative electrode to a positive electrode capacity of the positive electrode (negative electrode capacity/ positive electrode capacity) is from 0.6 to less than 1, and
the electrolytic solution comprises a non-aqueous solvent comprising lithium hexafluorophosphate and dimethyl carbonate, wherein a content ratio of dimethyl carbonate is 83% by volume or higher with respect to a total amount of the non-aqueous solvent.

11. The lithium ion secondary battery according to claim 10, wherein a content ratio of propylene carbonate is 0% by volume with respect to a total amount of the non-aqueous solvent.

12. The lithium ion secondary battery according to claim 10, wherein the spinel-type lithium-nickel-manganese composite oxide comprises a compound represented by $LiNi_xMn_{2-x}O_4$, wherein $0.3<X<0.7$.

13. The lithium ion secondary battery according to claim 10, wherein the spinel-type lithium-nickel-manganese composite oxide has a BET specific surface area of less than 2.9 $m^2/g$.

14. The lithium ion secondary battery according to claim 10, wherein the spinel-type lithium-nickel-manganese composite oxide has a BET specific surface area of 0.05 $m^2/g$ or larger.

15. The lithium ion secondary battery according to claim 10, wherein particles of the spinel-type lithium-nickel-manganese composite oxide have a median diameter D50 of from 0.5 µm to 100 µm.

16. The lithium ion secondary battery according to claim 10, wherein the lithium-titanium composite oxide has a BET specific surface area of less than 40 $m^2/g$.

17. The lithium ion secondary battery according to claim 10, wherein the lithium-titanium composite oxide has a BET specific surface area of 0.1 $m^2$/g or larger.

18. The lithium ion secondary battery according to claim 10, wherein particles of the lithium-titanium composite oxide have a median diameter D50 of from 0.5 μm to 100 μm.

19. The lithium ion secondary battery according to claim 1, wherein the content ratio of dimethyl carbonate is 85% by volume or higher with respect to a total amount of the non-aqueous solvent.

20. The lithium ion secondary battery according to claim 10, wherein the content ratio of dimethyl carbonate is 85% by volume or higher with respect to a total amount of the non-aqueous solvent.

* * * * *